United States Patent [19]

Burrows

[11] Patent Number: 4,604,723
[45] Date of Patent: Aug. 5, 1986

[54] BIT-SLICE ADDER CIRCUIT

[75] Inventor: James L. Burrows, Merrimack, N.H.

[73] Assignee: Sanders Associates, Inc., Nashua, N.H.

[21] Appl. No.: 542,325

[22] Filed: Oct. 17, 1983

[51] Int. Cl.$^4$ .............................................. G05F 7/50
[52] U.S. Cl. .................................................. 364/786
[58] Field of Search ............... 364/768, 772, 779, 782, 364/784, 785, 778, 780, 781, 783, 786, 715, 716, 200 MS File, 900 MS File

[56] References Cited

U.S. PATENT DOCUMENTS

| | | | |
|---|---|---|---|
| 3,749,899 | 7/1973 | Kohoutek | 364/785 |
| 4,021,652 | 5/1977 | Munter | 364/715 |
| 4,106,105 | 8/1978 | Pross, Jr. | 364/900 |
| 4,357,674 | 11/1982 | Ikeda et al. | 364/768 |

Primary Examiner—James D. Thomas
Assistant Examiner—Dale M. Shaw
Attorney, Agent, or Firm—Louis Etlinger; Wm. F. Porter, Jr.

[57] ABSTRACT

A bit-slice adder circuit for adding a plurality of input numbers in binary form. A tally circuit receives all of the bits from a bit position of all of the numbers and identifies the number of "ones" in that bit position. This information is coupled as address signals to a memory, which also receives, as address signals, carry signals. Each storage location at each address in the memory stores the sum of the carry portion of the location's address and the "ones" portion of the address signals from the tally circuit. The least significant bit of the addressed storage location is coupled to a shift register, and the remaining bits comprise the carry signals that are coupled to the memory's address input for the next signal from the tally circuit. After all of the bit positions in the input numbers have been coupled through the tally circuit, the sum is generated which comprises the last carry signal concatenated with the bits stored in the shift register.

3 Claims, 5 Drawing Figures (3,2) TALLY CIRCUIT (7,3) TALLY CIRCUIT (15,4) TALLY CIRCUIT

BIT-SLICE ADDER CIRCUIT

BACKGROUND OF THE INVENTION

1. Field of the Invention

The invention relates generally to the field of circuits for processing information in binary form, and more specifically to circuits for adding a plurality of numbers in word form having a selected number of binary digits, or bits. The circuit will find greatest utility in applications that require the addition of a large number of binary words, each comprising a smaller number of bits; that is, where the number of binary words, M, to be added exceeds the number of bits N in each word.

2. Description of the Prior Art

Adder circuits typically add pairs of numbers, in the form of digital words. However, if a particular application requires more than two words to be added together, such additions normally are performed on an iterative basis, with each word being added to a previous sum. Adders are usually used in data processing equipment that includes a clocking signal, and each addition is performed in synchronism therewith. Accordingly, the number of pulses of the clock signal that is required to add the words together approaches the number of words to be added; specifically, the number of clock pulses required is one less than the number of words that are being summed. It can be seen that if a large number of words are to be summed, a large amount of time, measured in clock pulses, may be spent in performing the addition.

SUMMARY OF THE INVENTION

The invention provides a new and improved adder circuit that adds a plurality of numbers comprising digital words in binary form. The invention includes a tally circuit that iteratively receives a digit, or bit, from one bit position, such as the least significant bit, second least significant, and so forth, from all of the words, on a bit-slice basis. The tally circuit identifies the number of binary "ones" in each bit position and generates a signal representative thereof, which is coupled to a memory as a portion of an address. The memory also receives, as the remainder of the address, a carry signal. Each addressable location in the memory stores a value equal to the sum of (1) the numerical value of the portion of the address from the tally circuit and (2) the numerical value of the portion of the address represented by carry signals. The contents of the addressed location are transmitted by the memory. The least significant bit is coupled to an input of a shift register, and the remaining bits are coupled to the memory's address inputs as the carry signals. After the tally circuit has received all of the bit slices of the input words, the carry signal is concatenated with the contents of the shift register, and the result is the sum of the input numbers.

An adder according to the invention therefore sums bit slices from all of the input words at once. Thus, if the adder operates on a bit slice at each pulse of a clocking signal and if the number of bits in the input words is less than the number of input words, the adder will perform the addition in less time than an adder that sums pairs of words on an iterative basis.

BRIEF DESCRIPTION OF THE DRAWINGS

This invention is pointed out with particularity in the appended claims. The advantages of this invention may be better understood by referring to the following description taken in conjunction with the accompanying drawings, in which:

DESCRIPTION OF THE PREFERRED EMBODIMENTS

Figure 1:
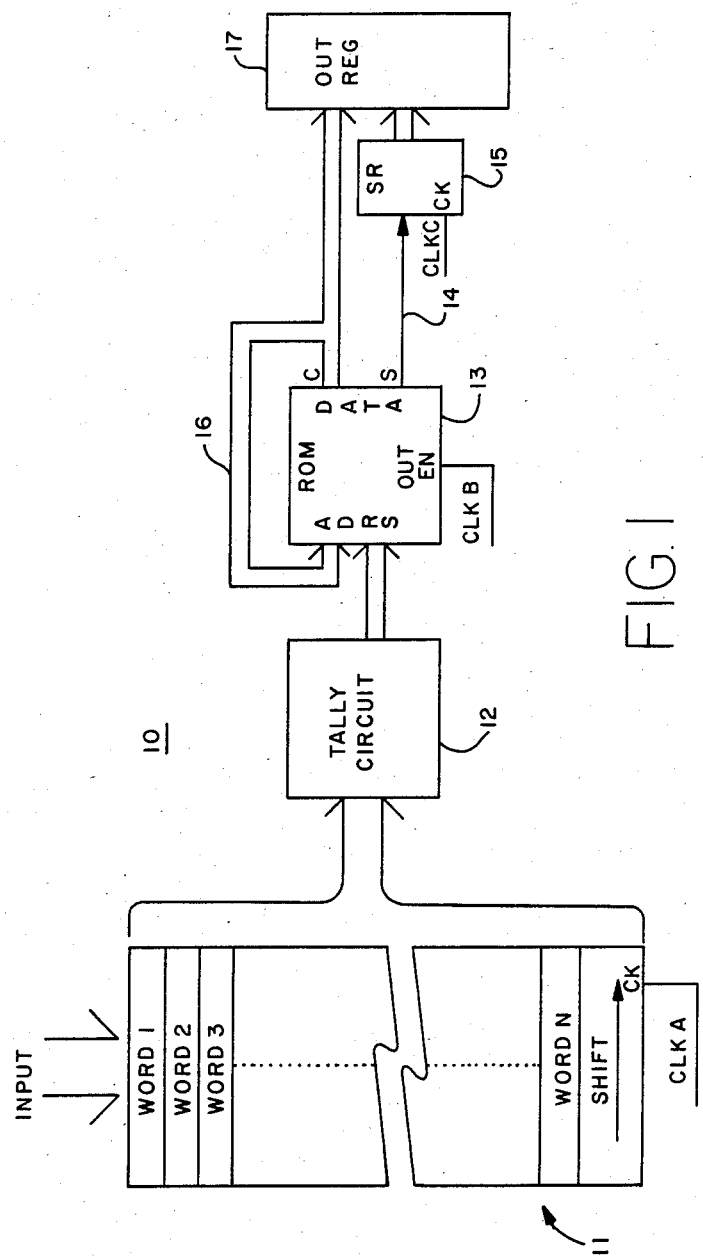
FIG. 1 is a general block diagram of an adder circuit constructed in accordance with the invention.

FIG. 1 depicts an adder circuit 10 constructed in accordance with the invention, including an input buffer 11 that receives all of the numbers to be summed. The numbers are in the form of words having multiple binary digits, or bits, that are generally arranged so that the least significant bit is in a rightmost bit position in the input buffer, and the most significant bit is in a leftmost bit position in the input buffer, as shown in FIG. 1.

After all of the words have been loaded into input buffer 11, a tally circuit 12 receives all of the bits from a selected bit position, or column, from all of the words stored in input buffer 11. The tally circuit 12 identifies the number of ones in that bit position, and couples a signal representative of that number to a read only memory (ROM) 13 as low-order address signals.

Read only memory 13 also receives, on a line 16, carry signals as high-order address signals that are generated as described below. Memory 13 stores, in a plurality of addressable storage locations, digital words each identified by the combined high- and low-order address signals. The digital word at each location has a numerical value equal to the sum of (1) the low-order address signals from the tally circuit and (2) the high-order address signals.

The low-order bit from the addressed location in memory 13 constitutes a sum bit S which is coupled via a line 14 to shift register 15. The remaining bits in the addressed storage location are coupled, via lines 16, as carry signals C to the high-order address inputs of memory 13. Lines 16 are also connected to an output register 17, which also receives parallel output signals from shift register 15.

In operation, at each pulse of the CLK A timing signal, the contents of each storage location in buffer 11 is shifted to the right, that is, in the least significant direction. The contents of the least significant bit locations in the buffer are coupled to the tally circuit 12, which in turn couples a signal to the low-order address input of memory 13 that identifies the number of binary "ones" in that bit position. At the same time, the carry signals C are coupled to high-order address inputs of memory 13. At the first clock pulse, that is in the first iteration of adder 10, in which the least significant bits in the words in input buffer 11 are coupled to tally circuit 12, the carry signals C will have a zero value, but in iterations involving higher order bit positions of the words, the carry signals may be non-zero. The signals from tally circuit 12 and the carry signals C identify a storage location, the contents of which are then transmitted, when enabled by the CLK B timing signal which is delayed from the CLK A timing signal to allow the addressed location to be accessed. The low-order bit "S" of the selected location is coupled on line 14 to an input of shift register 15, where it is latched by the CLK C timing signal. The high-order bits of the addressed location, that is, all bits other than the low-order bit "S", are coupled onto lines 16 as the C carry signal, which are coupled to the high-order address inputs of memory 13.

After the first iteration, the adder circuit 10 then performs the same operation on the second-least significant bits of the words stored in input buffer 11. The words in input buffer 11 are shifted to the right by one bit to enable the second-least significant bits to be coupled to tally circuit 11, in response to the CLK A timing signal. Tally circuit 12 again transmits a signal to the low-order address inputs of memory 13 identifying the number of binary "ones" present. At this point, there may be non-zero carry signals C at the high-order address inputs from the prior operation on the least significant bits. All of the address signals are used to identify a storage location in memory 13. As before, the contents of this location are transmitted by memory 13, with the least significant bit S again being transmitted to the shift register 15. The S bit previously stored, from the iteration for the least significant bit of the words in buffer 11, is then shifted and the new S bit is latched in the input of shift register 15.

Adder circuit 10 iteratively performs the above operations on all of the bit positions in the words stored in input buffer 11. When the last bit position has been processed, the carry output signals C on line 16 from memory 13 are coupled to output register 17, along with the contents of shift register 15 in parallel format. Output register then concatenates the carry signals C with the parallel signals from shift register 15, the result constituting the sum of all of the words in input buffer 11. The last carry signals C from memory 13 provide the most significant portion of the contents of output registers 13, and the contents of the shift register provide the least significant portion, with the first bit, generated by the operation on the least significant bits of the words in buffer 11 constituting the least significant bit in the result in output register 17.

A specific example, which will be described in connection with FIG. 2, will serve to illustrate the operation of the adder 10. In this example, input buffer 11 receives and stores sixty-three words (M=63) each having six bits (N=6), all of which are binary "ones". Thus, the example depicted in FIG. 3 illustrates the addition of sixty-three words all of which have the numerical value "63" in binary form.

Figure 2:
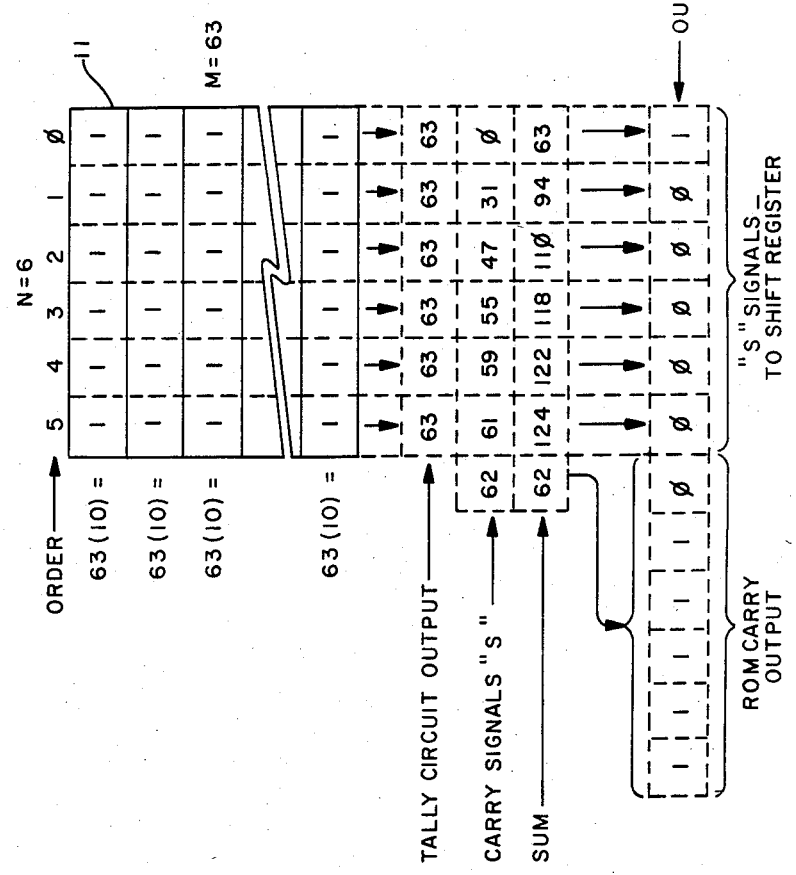
FIG. 2 is a diagram useful in explaining the operation of the circuit of FIG. 1.

The tally circuit 12 first receives all of the "ones" that are stored in the least significant bit position, that is, in the rightmost column as shown in input buffer 11 in FIG. 2. The output signals of the tally circuit indicate that there are sixty-three "ones" in this bit position. The tally circuit output signals comprise the low-order address signals coupled by tally circuit 12 to memory 13, and have a numerical value of "63" (decimal). Since this is the first iteration, the carry signals on lines 16 have the numerical value "zero". Thus, the high-order address signals have the numerical value "zero". The addressed storage location in memory 13 contains the sum of the low-order address signals and the high-order address signals, that is, the number "63" (decimal) which, in binary form, is (0111111). The least significant bit of the addressed location, a binary "1", is transmitted as an S signal on line 14 and the remaining signals, that is, signals (011111), or "31" (10), are transmitted as carry signals C on lines 16. The S signal on line 14 is stored in shift register 15 (FIG. 1) and will end up as the least significant bit in output register 17 as shown in FIG. 2.

For the second iteration, which is performed on the second least significant bit position of the words stored in input buffer 11, that is, the column labeled "1" in buffer 11, the tally circuit 12 determines that there are again sixty-three "ones" in the bit position, and generates a signal having the numerical value "63" (decimal) that again is coupled to the least significant address inputs to memory 13. At this time, the carry signal C on lines 16 has a numerical value "31" (decimal) from the previous iteration. The addressed location of memory 13 thus contains a word having the numerical value "94" (decimal), or (1011110) (binary), which again is the sum of the values of the high-order address signals, "31" (decimal), and the low-order address signals, "63" (decimal). Again, the least significant bit, a binary 0 is coupled as an S signal on the line 14 to shift register 15 and will constitute the second least significant bit of the sum in output register 17 as depicted in FIG. 2. The remaining bits provide the C carry signals that are coupled on line 16 to the most significant address inputs of memory 13 for the next iteration.

This process continues until the last iteration, in which the most significant bits of the words in input buffer 11 are processed. As shown in FIG. 2, the numerical value of the carry signal C lines 16 at this point is "61" (decimal) or (1111010) (binary). The tally circuit output signal again has the numerical value 63, and the addressed location stores a signal having the numerical value "124" (decimal), or (1111100) (binary). Again this is the value of the sum of the high-order address signals, "61" (decimal) and low-order address signals "63" (decimal). The least significant bit of the location, a "0", is coupled as the S signal to shift register 15. The carry signal C from memory 13, which is a (111110) (binary), or 62 (decimal), is loaded into the most significant portion of output register 17. The contents of the shift register 15, now in parallel form, are also loaded into output register 17 and concatenated at the least significant end of the carry signals. The result constitutes the sum of the words in input buffer 11. For this example, the output register 17 contains the binary value depicted in FIG. 2, which equals the value 3969 (decimal), which in turn is the sum of "63" (decimal), sixty-three times.

It should be noted that in a conventional adder circuit, the sum would require sixty-two separate additions or iterations. However, using this invention, the sum of the sixty-three six-bit words requires only six iterations, one for each bit position in the words being added.

Figure 3A:
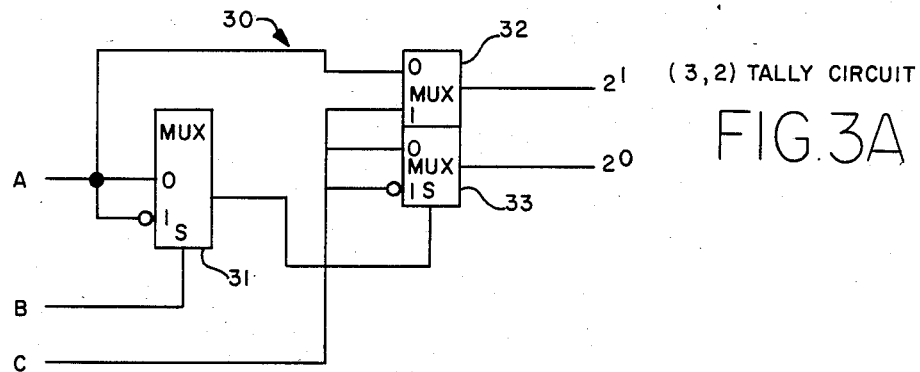
FIGS. 3A, 3B and 3C are block diagrams of tally circuits that may be used in conjunction with the adder circuit of FIG. 1.
Figure 3B:
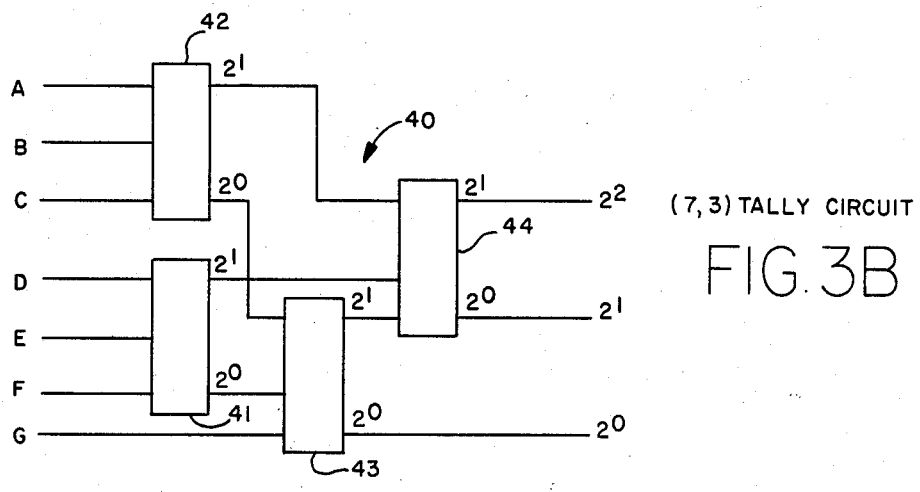
Figure 3C:
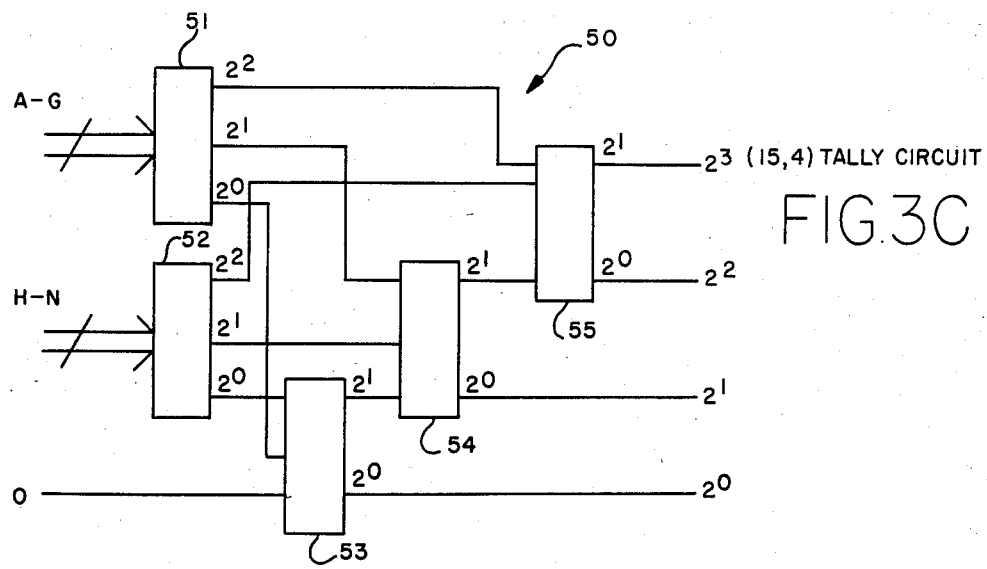

As has been mentioned, tally circuits, such as tally circuit 12, identify the number of binary "ones" that are present at their inputs, and transmit a signal representative thereof. Examples of tally circuits are presented in Carver Mead and Lynn Conway, *Introduction To VLSI Systems,* Addison-Wesley Publishing Co. (1980) at pp. 78–79. FIGS. 3A, 3B and 3C also depict examples of tally circuits, in which the output signals are binary encoded. The output signal from tally circuit 12 need not be binary encoded. However, if the output signal is binary-encoded, the number of output lines can be reduced considerably.

FIG. 3A depicts a tally circuit for identifying the number of ones in three input signals A, B and C. This tally circuit has three inputs and two outputs, and thus is termed a (3,2) tally circuit. The tally circuit of FIG. 2A is a conventional adder circuit 30 comprising three multiplexers 31, 32, and 33. If the select input "S" of the multiplexers receives a negated signal, that is, a binary "zero", the signal at the "0" input is coupled therethrough. Conversely, if the signal at the select input is asserted, or a binary "one", then the signal at the "1" input is coupled therethrough. Furthermore, the circle or bubble inputs to the "1" inputs of multiplexers 31 and 33 indicate that the signal input thereto is inverted.

FIG. 3B depicts a (7,3) tally circuit 40 in which the number of "ones" present in seven inputs is determined and an output signal is generated in response thereto. The output signal is binary encoded. The (7,3) tally circuit comprises four of the (3,2) tally circuits 30 identified as 41, 42, 43, and 44.

As a final example, FIG. 2C depicts a (15,4) tally circuit 50, which includes two of the (7,3) tally circuits 40 of FIG. 2 at 51 and 52, and three of the (3,2) tally circuits 30 at 53, 54, and 55. The (15,4) tally circuit has 15 inputs and, in four outputs, identifies the number of "ones" present at the inputs.

Tally circuits of increasing complexity may be generated using these tally circuits. Generally, a tally circuit having "n" outputs will accommodate "$2^n-1$" inputs, accordingly, the general name for a tally circuit having binary-encoded outputs is ($2^n-1$, n). Comparing the tally circuits in FIGS. 3B and 3C, and extrapolating therefrom, it is evident that tally circuits of any order "n" can be constructed using two tally circuits of order (n−1) to receive all but one of the inputs, and (n−1) of the (3,2) tally circuits to perform a binary encoding operation. Thus, a (31,5) tally circuit may be constructed using two (15,4) tally circuits, which receives thirty of the input signals, and four (3,2) tally circuits. One of the (3,2) tally circuits would receive the 2° output signals from the (15,4) tally circuits and the remaining input signal. The remaining (3,2) tally circuits would receive the same $2^i$ output signals from the (15,4) tally circuits, and the $2^1$ output signal from the (3,2) tally circuit that received the $2^{i-1}$ output signal from the (15,4) tally circuits. Higher orders of tally circuits may be constructed in the same way.

The foregoing description is limited to a specific embodiment of this new adder circuit. It will be apparent, however, that this invention can be practiced in digital circuitry having diverse basic constructions or that use different internal circuitry than is described in the specification with the attainment of some or all of the objects and advantages of the invention. Therefore, it is the object of the appended claims to cover all such variations and modifications as come within the true spirit and scope of this invention.

What is claimed as new and desired to be secured by Letters Patent of the United States is:

1. A bit slice adder for forming a sum of a plurality of words each comprising a plurality of binary digits comprising:
   (A) input means for iteratively receiving one binary digit slice from all of the words in parallel,
   (B) tally means for iteratively receiving the binary digit slice from the input means and for transmitting an output signal having a value corresponding to the number of binary ones in the binary digit slices from the input means; and
   (C) memory means connected to receive the output signal from the tally means for generating an output signal and a carry signal, in response to each output signal from the tally means for the particular binary digit slice, the memory means including a plurality of address inputs, the address inputs comprising high-order address inputs and low-order address inputs, the output signal from the tally means being coupled to the low-order address inputs and the carry signal from the memory means being coupled to the high-order address inputs, the output signal from the tally means and the carry signal from the memory means being coupled to the memory means address inputs as address signals, and the memory means output signal being representative of the sum of the number identified by the tally means and the carry signal generated in response to a previous iteration,
   the memory means further comprising a plurality of storage locations each uniquely identified by the signals coupled to said address inputs, each storage location storing a value equal to the sum of the value corresponding to the low-order address inputs and the high-order address inputs which identify the location.

2. An adder as defined in claim 1 wherein each storage location includes a least significant digit and at least one more significant digit, the more significant digit constituting the carry signal, the adder further comprising means for iteratively receiving and storing the least significant digit from the addressed storage location during each iteration.

3. An adder as defined in claim 2 wherein said receiving and storing means comprises a shift register that iteratively receives the least significant digits from the addressed storage locations during the iterations, and an output register that receives carry signal from the memory at the end of the iterations and concatenates it with the parallel output from the shift register.

* * * * *